United States Patent
Zhang

(10) Patent No.: US 6,662,604 B1
(45) Date of Patent: Dec. 16, 2003

(54) ANTI-THEFT MEANS FOR VEHICLE

(76) Inventor: Songyan Zhang, 9 Koenig Road, Beijing (CN)

( * ) Notice: Subject to any disclaimer, the term of this patent is extended or adjusted under 35 U.S.C. 154(b) by 0 days.

(21) Appl. No.: 09/600,336

(22) PCT Filed: Jan. 11, 1999

(86) PCT No.: PCT/CN99/00005
§ 371 (c)(1),
(2), (4) Date: Jul. 13, 2000

(87) PCT Pub. No.: WO99/36298
PCT Pub. Date: Jul. 22, 1999

(30) Foreign Application Priority Data

Jan. 13, 1998 (CN) .......................... 98100236 A

(51) Int. Cl.$^7$ .............................................. B60R 25/02
(52) U.S. Cl. ........................... 70/189; 70/197; 70/204; 70/218; 70/223; 70/247
(58) Field of Search ....................... 70/245, 247, 188, 70/189, 218, 223, 195, 197, 201, 204

(56) References Cited

U.S. PATENT DOCUMENTS

| | | | | |
|---|---|---|---|---|
| 1,005,496 A | * | 10/1911 | Armbruster | 70/223 |
| 1,437,160 A | * | 11/1922 | Sokolov et al. | 70/223 |
| 1,520,643 A | * | 12/1924 | Godshalk | 70/223 |
| 1,552,586 A | * | 9/1925 | Vanderlip | 70/223 |
| 1,591,034 A | * | 7/1926 | George | 70/223 |
| 1,662,099 A | * | 3/1928 | Anderson | 70/204 |
| 1,662,643 A | * | 3/1928 | Hosford | 70/204 |
| 2,844,021 A | * | 7/1958 | Bryant | 70/218 |
| 3,566,634 A | | 3/1971 | Borck | 70/252 |
| 3,625,032 A | * | 12/1971 | Muhleck | 70/202 |
| 5,172,576 A | | 12/1992 | Milton | 70/185 |
| 5,345,797 A | * | 9/1994 | Hayes | 70/223 X |
| 5,415,019 A | | 5/1995 | Perez | 70/183 |
| 5,437,350 A | | 8/1995 | Sallez et al. | 180/287 |
| 5,913,909 A | * | 6/1999 | Schwab | 70/247 |

FOREIGN PATENT DOCUMENTS

| | | |
|---|---|---|
| EP | 0 268 879 A1 | 6/1988 |
| EP | 0 634 310 A1 | 1/1995 |
| EP | 0 701 932 A1 | 3/1996 |
| WO | WO 96/04486 | 2/1996 |

* cited by examiner

*Primary Examiner*—Lloyd A. Gall
(74) *Attorney, Agent, or Firm*—Pennie & Edmonds LLP

(57) ABSTRACT

An anti-theft device for vehicle steering mechanism, such as a steering shaft or a transmission rod, having a rotatable shaft. The anti-theft device has a fixing member fixed on the vehicle body, a connecting member joined with a steering handle, a locking member controlled by code device, a movable member provided on the rotatable shaft, for moving along the shaft but not rotatable around it. The movable member can move between a first position and a second position under the control of the locking member. When in the first position the movable member is engaged with the fixing member while disengaged with the connecting member so that the shaft can not rotate. When in the second position, the movable member is engaged with the connecting member while disengaged with the fixing member so that the shaft can rotate. The anti-theft device according to the invention has double functions of disconnecting transmission of steering force as well as locking the shaft.

7 Claims, 5 Drawing Sheets

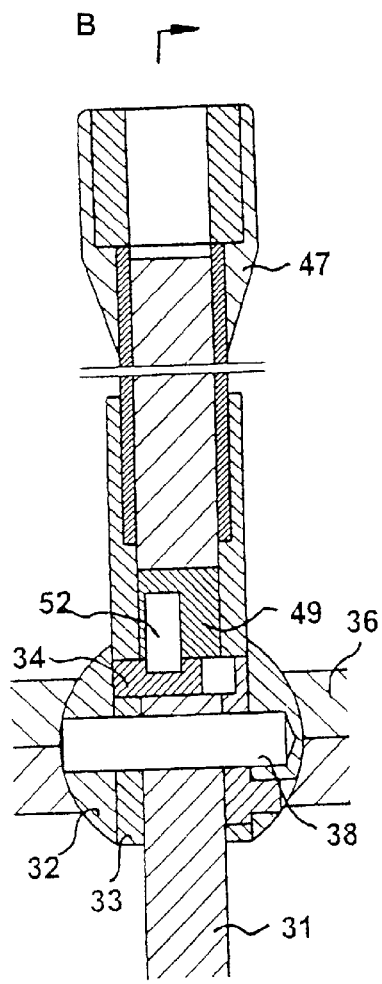
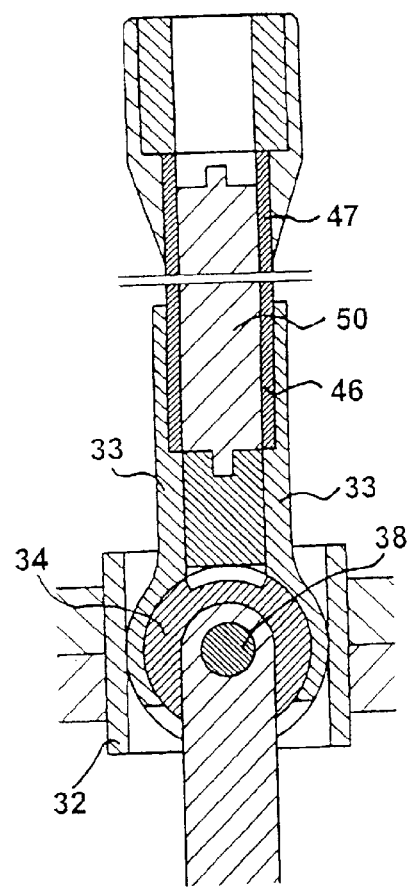
Fig 4A
Fig 4B

ANTI-THEFT MEANS FOR VEHICLE

FIELD OF THE INVENTION

The present invention relates to an anti-theft device, in particularly to an anti-theft device for use in means of transportation.

BACKGROUND OF THE INVENTION

Two types of mechanical anti-theft devices similar to the invention are known in the art. One is the lock for steering wheel, which, when in use, is attached to the steering wheel with the lock tongues clamping the steering wheel so as to prevent the wheel from rotating. The other is the lock for shifting lever (Utility model patent CN2223223Y), in which the shifting lever is divided into an upper section and a low section connected by a wire. The upper section is provided with a slider controlled under a key and coupled to the low section. The motion of the upper section will not be transmitted to the low section upon the separation between the slider and the low section accomplished by rotating the key. Both devices however have disadvantages. For the fomer, the locking condition can be easily released by applying increased torque to the lock tongue or lock body to damage it; for the latter, the operating mechanism of a vehicle can be restored to function by replacing the upper section with another component.

The object of the invention is to provide a simple and reliable anti-theft device for use in the means of transportation, which, as a part of the route of transmission, is arranged in the operating mechanism. Such device, when in anti-theft condition, not only can disrupt the transmission of the operating force, but also lock the components for the transmission. Since the anti-theft device according to the invention is arranged within the steering system or gearbox, an unallowed user will not be able to release the anti-theft condition unless damage to the vehicle body.

SUMMARY OF THE INVENTION

The above-mentioned object can be reached by providing an anti-theft device for use in the means of transportation in accordance with the present invention, comprising: a mounting bracket for supporting the anti-theft device and mounted on the body of the means of transportation; a connecting member coupled to a manually operated component; a lock unit movable under the control of a coded means; and a movable member arranged slidably but non rotatably on a steering column or shifting pin of the means of transportation, when the lock unit being activated the movable member being cause, through the means of transmission between the movable member and lock unit, to move between a first position in which the movable member is engaged with the mounting bracket and simultaneously disengaged with the connecting member, and a second position in which the movable member is engaged with the connecting member and simultaneously disengaged with the mounting bracket.

The means of transmission between the movable member and the lock unit comprises a eccentric pin disposed on the lock unit and a groove disposed on the movable member, the eccentric pin being engaged with the groove, the groove extending substantially perpendicularly to the direction in which the movable member is moved.

The movable member is attached to the steering column or shifting pin through key or spline.

The movable member is provided with a notch which extends in the direction in which the movable member is moved, the end of the shifting pin being disposed within the notch such that the movable member is able to slide laterally but not rotate relative to the shifting pin.

The engagement between the movable member and the mounting bracket is accomplished through the teeth provided on the movable member and the mounting bracket, respectively, and the engagement between the movable member and the connecting member is accomplished through the teeth provided on the movable member and the connecting member, respectively.

The manually operated component is a steering wheel or a steering handle.

The manually operated component is a shifting lever or shifting handle disposed pivotally on the connecting member, one end of the shifting lever is connected to the shifting pin.

The connection between the shifting lever and the shifting pin is ball socket connection.

The engagement between the movable member and the mounting bracket is accomplished through at least one projection provided on the mounting bracket and at least one complementary cut, and the engagement between the movable member and the connecting member is accomplished through at least one projection provided on the movable member and at least one complementary cut provided on the connecting member.

The mounting bracket is secured on the vehicle body.

The connecting member and the end of the shifting pin are rotatably mounted on the mounting bracket through a stud, while the mounting bracket is rotatably mounted on the vehicle body, with the axis of the stud being perpendicular to the axis around which the mounting bracket rotates.

BRIEF DESCRIPTION OF THE DRAWINGS

FIG. 4A is a cross-sectional view showing the assembled condition of the anti-theft device shown in FIG. 3 and FIG. 4B is a cross-sectional view taken along the line B—B in FIG. 4A.

DETAILED DESCRIPTION OF THE INVENTION

Figure 1:
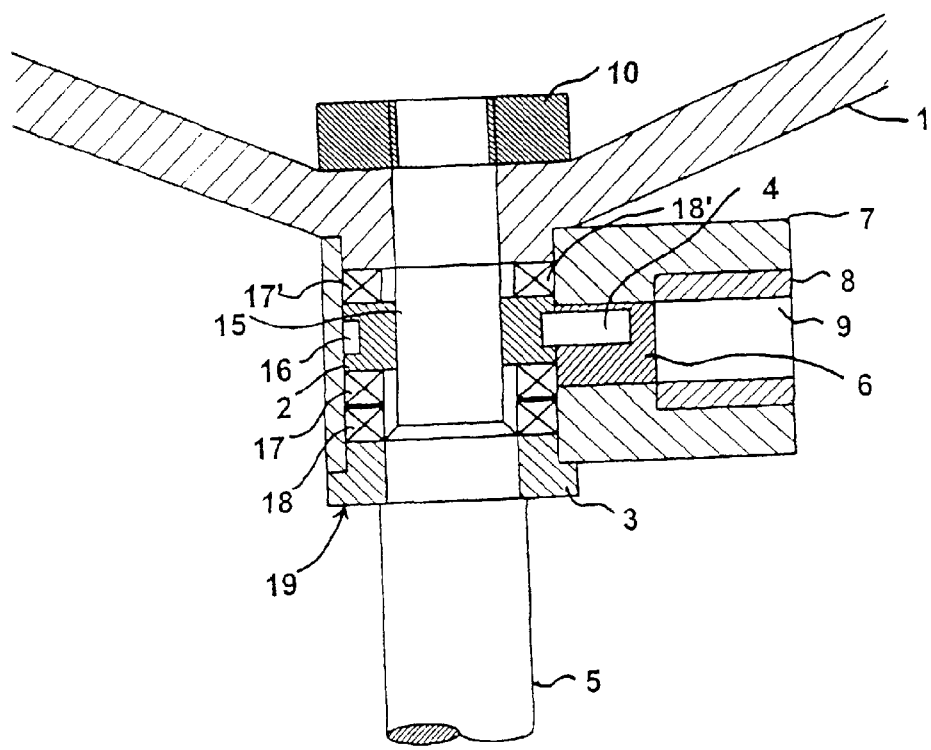
FIG. 1 is a cross-sectional view showing the first embodiment of the invention.

FIG. 1 shows the first embodiment of the anti-theft device in accordance with the present invention. Such device is usually used in the operating system for steering of a means of transportation, such as the steering column 5 of a vehicle or boat. According to the invention, the anti-theft device mainly includes a connecting member 1, a mounting bracket 3, a movable member 2 and a locking unit movable under the control of a coded means. The coded means is illustrated to be a key, but can alternatively be in the form of a group of coded discs or a magnetic card. Mounting bracket 3 is secured on the vehicle body with the steering column 5 extending through the mounting bracket 3 and supported rotatably on the bracket 3. Connecting member 1 is rotatably attached to the steering column 5 and spaced axially from the mounting bracket 3. Connecting member 1 is held in predetermined position on the steering column 5 by a limit nut 10. The connecting member 1 has a manual operating structure (not shown) coupled thereto, such as the steering wheels for vehicles or boats, or the handles for motorbikes.

Movable member 2 is arranged between the connecting member 1 and the mounting bracket 3. The movable member 2 is attached to the steering column 5 through spline or key 15 so that movable member 2 can slide axially but not rotate relative to the steering column 5. The movable member 2 has a groove 16 formed on its outer periphery. The groove 16 defines a plane substantially perpendicular to the axis of the steering column 5.

There is provided a lock body 7 for receiving the locking unit between the connecting member 1 and mounting bracket 3. The locking unit includes a locking pin 9 (shown only schematically) arranged therein for rotating under the control of a key (not shown). The rotating axis of the locking pin 9 is substantially perpendicular to the rotating axis of the steering column 5. Pin 9 is inserted into the locking core 8 in traditional way, and connected to a shaft 6 at the end facing the steering column 5. Core 8, pin 9 and shaft 6 are coaxial. Thus, shaft 6 will be rotated upon the rotation of the pin 9, and the rotating axis of shaft 6 is also substantially perpendicular to the rotating axis of the steering column 5. Shaft 6 has an eccentric pin 4 secured thereto at the end surface away from the locking pin 9 and toward the steering column 5. Eccentric pin 4 is arranged to be able to engage with the groove 16 formed on the outer periphery of the movable member. When shaft 6 is rotated, movable member 2 can be moved along the steering column 5 between the position close to the mounting bracket 3 and the position close to the connecting member 1 through the engagement of eccentric pin 4 and groove 16, as shown in FIG. 1.

Two end surfaces of the movable member 2 are formed with teeth 17 and 17', respectively. Teeth 17 and 17' can be of any types known in the art. Meanwhile both mounting bracket 3 and connecting member 1 have corresponding teeth 18,18' formed at the end surfaces of them facing toward movable member 2, respectively. Teeth 17,17' on the movable member 2 can engage with teeth 18, 18' on the mounting bracket 3 and connecting member 1, respectively.

The operation of the anti-theft device 19 shown in FIG. 1 now will be described. When setting the anti-theft device in the anti-theft condition, the operator can insert the key into the locking pin 9 and rotate by a certain angle, as a result of which the eccentric pin 4 is pivoted around the axis of the shaft 6 by a corresponding arc. Through the engagement with groove 16 on the movable member 2, the eccentric pin 4, while pivoting around the axis of shaft 6, will urge the movable member 2 to move away from the connecting member 1 and toward the mounting bracket 3 so that the teeth 17' on the movable member are disengaged with the teeth 18' on the connecting member 1 while the teeth 17 on the movable member come into engagement with the teeth 18 on the mounting bracket 3. Thus the anti-theft device 19 is set in the anti-theft condition. In this condition, the steering wheel or handle can only rotate freely on the steering column 5 without driving the steering column 5 to rotate. Meanwhile, since the mounting bracket 3 is secured on the vehicle body and the teeth 17 of the movable member 2 is engaged with the teeth 18 of the mounting bracket 3, steering column 5 is locked on the vehicle body and prevented from rotation. When releasing the device from the anti-theft condition, he or she may simply insert the key into the locking pin 9 and rotate the same in an opposite direction.

Figure 2:
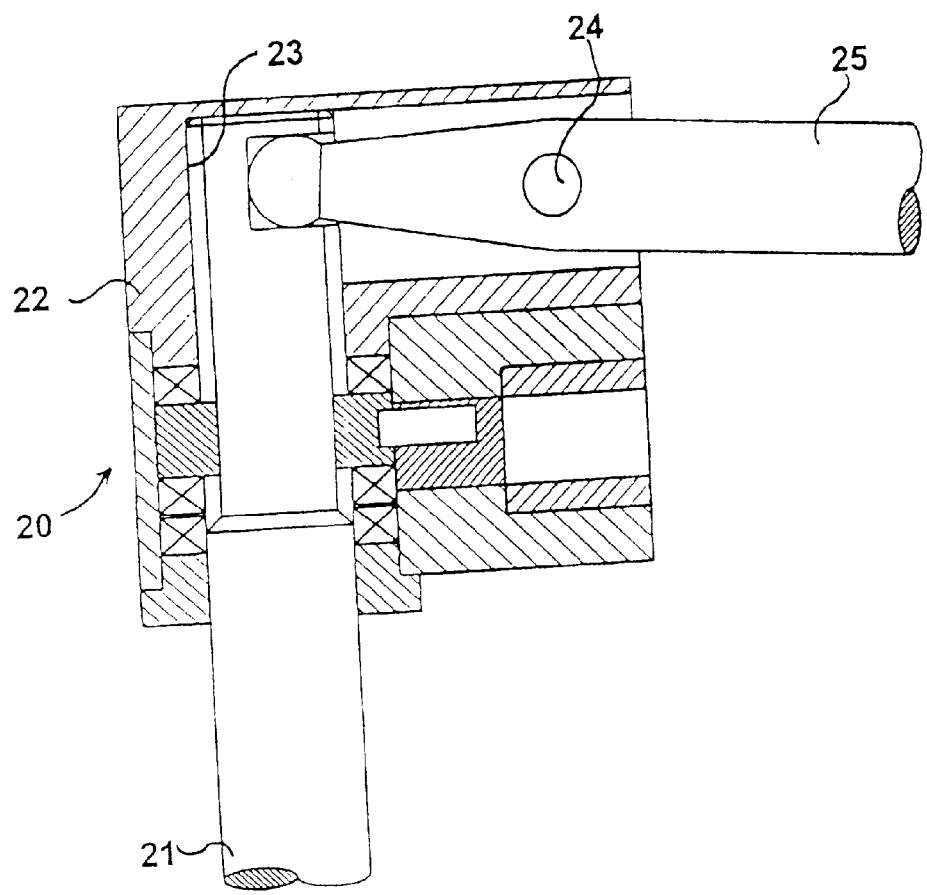
FIG. 2 is a cross-sectional view showing the second embodiment of the invention.

FIG. 2 illustrates a second embodiment of the invention. The anti-theft device 20 according to this embodiment can be used in such a shifting mechanism of a vehicle, in which the shifting pin 21 not only needs to be rotated around its axis but also moved in axial direction during the operation of shifting. The movement of the shifting pin in axial direction is for selection of the gearing position, and the rotation thereof is for entering into the gearing position. The structure and the operating method of the anti-theft device 20 shown in FIG. 2 is similar to the anti-theft device 19 shown in FIG. 1 except that, to achieve the function for selection of the gearing position, the mechanism for moving the shifting pin 21 axially is added. For the purpose of simplification, the portion of anti-theft device 20 same as anti-theft device 19 will not be described in the following.

An elongated hole 23 for receiving the upper end of the shifting pin 21 and allowing the shifting pin 21 to rotate and slide therein is formed on the connecting member 22 of the anti-theft device 20. There is formed on the connecting pin 21 a stud 24 spaced from the axis of the hole 23 with its axis substantially perpendicular to the axis of the hole 23. A shifting lever 25 is pivotally arranged on the stud 24. One end of the shifting lever 25 is coupled to the upper end of shifting pin 21 by ball socket connection. When the operator push or pull, around the stud 24, the end of the shifting lever 25 opposite to the ball socket connection, the shifting pin 21 can be caused to move axially in the hole 23.

When the anti-theft device 20 is in the non anti-theft condition as shown in FIG. 2, the operator can cause the shifting pin 21 to rotate around its axis and move in its axial direction by moving the shifting lever 25 around the pin 21 and the stud 24, respectively, and perform thereby the shifting action. In the case that the operator has set the device 20 in the anti-theft condition (referring to the corresponding description to the anti-theft device 19) by inserting and rotating a key, the rotation of the shifting lever around the axis of the shifting pin 21 applied by an unallowed user can only cause the connecting member 22 to rotate freely, instead of driving the shifting pin 21 to rotate. Thus, the unallowed user will not be able to accomplish the shifting operation and therefor to use the vehicle or boat.

Figure 3A:
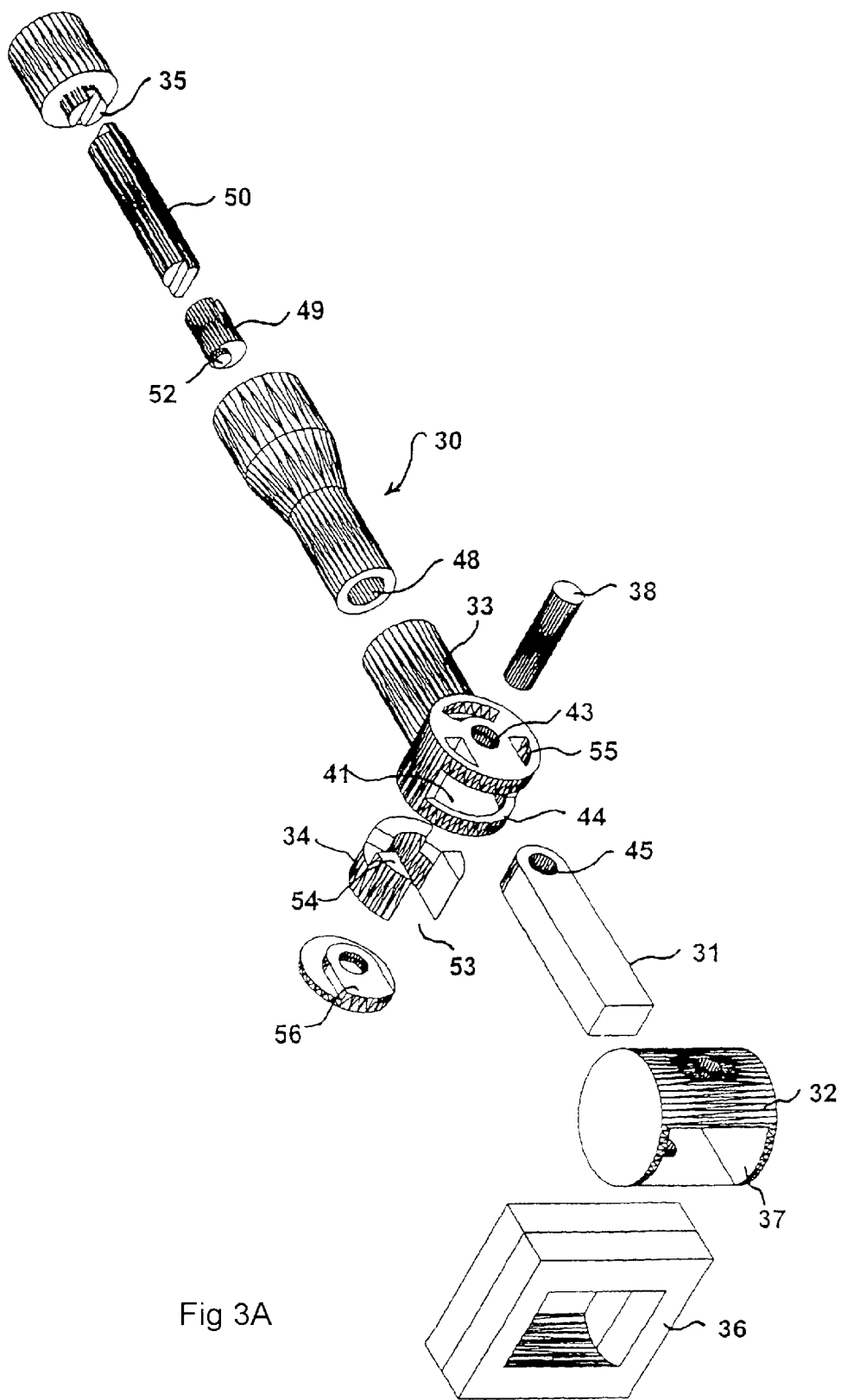
FIGS. 3A and 3B are an exploded perspective view showing the third embodiment of the invention.
Figure 3B:
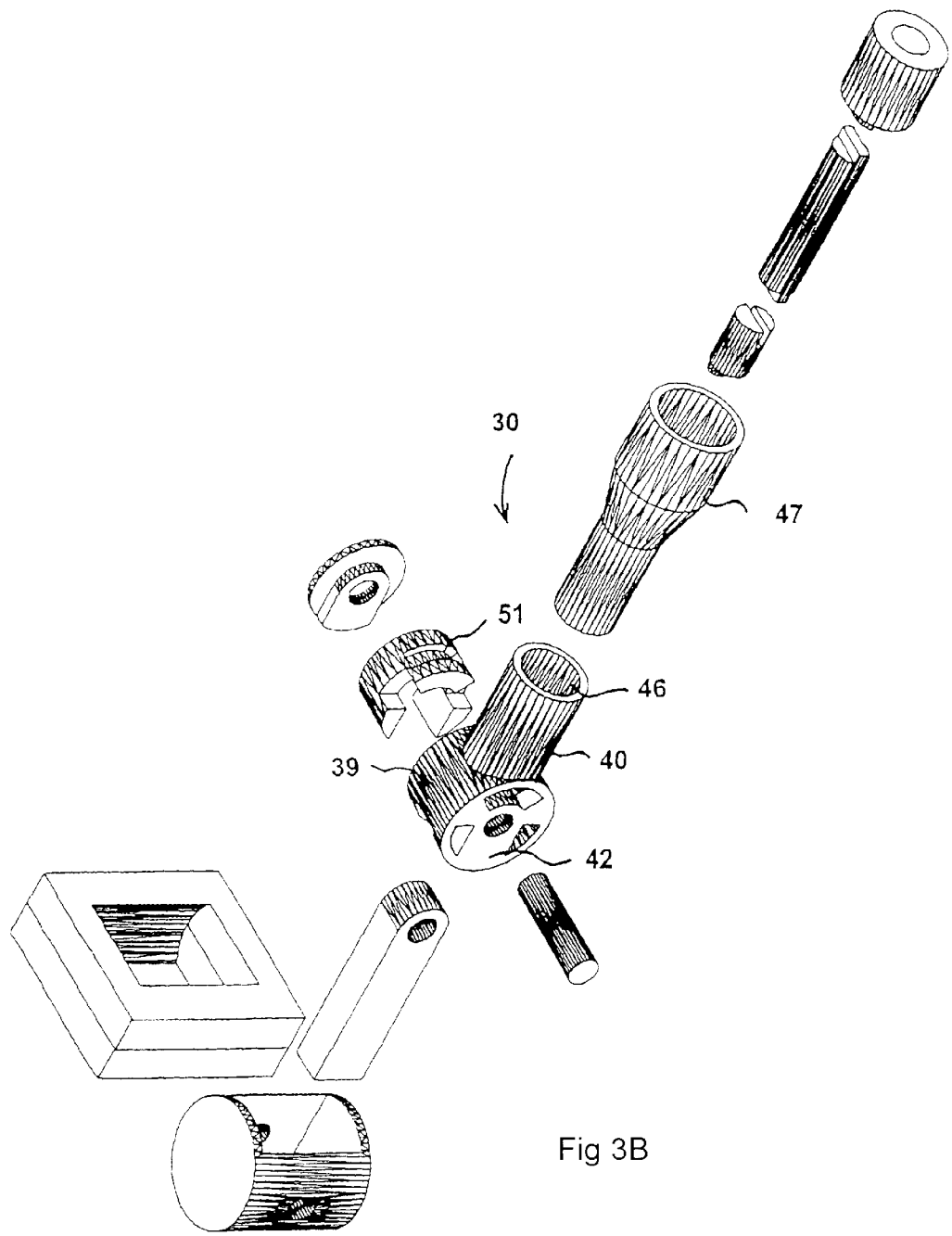

FIGS. 3 and 4 illustrate a further embodiment of the anti-theft device according to the invention. The anti-theft device 30 in accordance with this embodiment may be used in such a shifting mechanism wherein the shifting handle 47 need to be pivoted around two axes substantially perpendicular to each other during the shifting operation. Pivoting around one of the axes is for selection of the gearing position, and pivoting around the other axis is for entering into the gearing position.

As best shown in exploded perspective views 3A and 3B, the anti-theft device 30, similar to the embodiment shown in FIG. 1, mainly comprises a mounting bracket 32, a connecting member 33, a movable member 34 and a locking unit controlled by a key.

The mounting bracket 32 is cylindrical in the shape and attached to a support 36. Support 36 may be a separate element secured on the vehicle body or a part of the vehicle body. Support 36 comprises an inner surface, a portion of which is cylindrical for mating with a corresponding cylindrical outer surface on the mounting bracket 32. Thus, after attached to the support 36, the mounting bracket 32 will be able to rotate around the axis of said cylindrical surface relative to the vehicle body. A through hole or chamber 37 extending perpendicularly to the axis of the mounting bracket 32 is formed through the mounting bracket 32 for receiving the connecting member 33 and one end of a shifting pin 31. The other end of the shifting pin 31 is coupled to a corresponding element in the gear case (not shown) for moving the gears. A stud 38 which is substantially perpendicular to the axis of the mounting bracket 32 and extends transversely through the chamber 37 is provided on the mounting bracket 32 for supporting rotatably the connecting member 33 and the shifting pin 31 thereon.

Connecting member 33 is comprised of a body portion 39 and a connecting portion 40, both of which are cylindrical in the shape preferably. A cylindrical recess 41 extending coaxially with the axis of the body portion 39 is formed on the body portion 39 with one end being open and another end being enclosed by an end wall 42 of the body portion 39. The end wall 42 includes a bore 43 that extends coaxially with the recess 41 and the body portion 39. During assembly, the connecting member 33 is mounted within the chamber 37 of the mounting bracket 32 by inserting the stud 38 through the bore 43. As shown in FIG. 4B, bore 43 is sized so that the connecting member 33 can rotate freely around the stud 38.

A rectangular opening 44 is formed through the cylindrical surface of the recess 41 for the passage of the shifting pin 31. The shifting pin 31 is formed a bore 45 for supporting rotatably the shifting pin 31 on the stud 38 at the end away from the gear case and inserting through the opening 44. In this way, the connecting member 33 and the shifting pin 31 can be coupled to the mounting bracket 32 by means of the stud 38, and the connecting member 33, the shifting pin 31 and the mounting bracket 32 can be made to rotate relative to each other. The length of the opening 44 extend substantially perpendicularly to the axis of the recess 41 and bore 43 and should be long enough to allow the connecting member 33 to rotate relative to the shifting pin 31 by a determined angle.

The connecting portion 40 of the connecting member 33 is provided on the body portion 39 with its axis extending perpendicularly to the axis of the body portion 39. A through bore 46 extending radially from the body portion 39 and opposite to the opening 44 is formed on the connecting portion 40. Through bore 46 is open to the recess 41. A shifting handle 47 is secured to connecting member 33 through the press fit or weld between the through bore 46 and the outer cylindrical surface of the shifting handle 47, as shown in FIGS. 4A and 4B.

On the shifting handle 47, an axial bore 48 that is coaxial with the through bore 46 is provided. Said locking unit is arranged within the bore 46 and 48. Similarly, the locking unit has a locking pin 35 rotatable under the control of a key and a shaft 49. The locking pin 35 and the shaft 49 are connected together by a transmission rod 50 through tenon and mortise joint so as to transmit the rotation from the locking pin 35 to the shaft 49.

There is provided with a movable member 34 within the recess 41, which has an outer cylindrical surface corresponding to the inner cylindrical surface of the recess 41 so that it can slide axially within the recess 41. On the outer cylindrical surface of the movable member 34, a groove 51 perpendicular to the direction in which the movable member 34 slides is formed. Upon assembled within the recess 41, groove 51 will be brought to engage with an eccentric pin 52 provided on the end surface of the shaft 49. Then, when rotated clockwise or counter clockwise, the eccentric pin 52 will cause the movable member 34 to move axially within the recess 41.

A notch 53 extending along the direction in which the movable member 34 moves, i.e. the axial direction of the stud 38, is formed on the movable member 34 at the position corresponding to the opening 44. The notch 53 is so shaped that it can receive the end of the shifting pin 31 supported rotatably on the stud 38 and allow the movable member 34 to move transversely, but not pivot, relative to the shifting pin 31.

On the end of the movable member 34 facing the end wall 42, a plurality of projections 54 is formed to upright therefrom. Meanwhile, a plurality of complementary cuts 55 is formed on the end wall 42 of the connecting member 33. When the movable member 34 is moved to the end wall 42, the projections 54 may engage with the complementary cuts 55. Similarly, the chamber 37 of the mounting bracket 32 has a projection 56 formed on the side close to the opening end of the recess 41 of the connecting member 33. The projection 56 can be formed as a separate element and then secured on said side of the chamber 37 by, for example, welding, as shown in FIG. 3 or 4. The size and shape of the projection 56 is corresponding to that of the notch 53 so that the projection 56 will come into engagement with the notch 53 of the movable member 34 when the movable member 34 is moved from the end wall 42 to the projection 56.

FIGS. 4A and 4B illustrate the assembled state of the anti-theft device 30. The device 30 is operated as follows:

The operator can set the anti-theft device 30 in the anti-theft condition by inserting a key into the locking pin and rotating a predetermined angle. Such rotation, through the transmission of rod 50, shaft 49 and eccentric pin 52 engaging with groove 51, causes the movable member 34 to move within the recess 41 toward the projection 56 of the mounting bracket 32 along the stud 38 (i.e. the end of shifting pin 31), until the notch 53 of the movable member 34 to engage with the projection 56 and the projections 54 of the movable member 34 to disengage with the cuts 55 formed on the end wall 42. In this condition, since the projections 54 no longer engage with the cuts 55 of the connecting member, pivot of the shifting handle 47 around the stud 38 applied by the operator during the operation of shifting can only cause the shifting handle 47 to rotate freely on the stud 38 without transferring the pivot to the shifting pin 31. Meanwhile, since the notch 53 of the movable member engages with the projection 56 of the mounting bracket and the shifting pin 31 can not rotate relative to the movable member 34, the shifting pin 31 is locked on the mounting bracket 32 and not able to pivot around the stud 38. Thus, operation of shifting can not be accomplished effectively in this condition. If the operator want the device 30 to be in a non anti-theft condition, what he or she need to do is to rotate the key by a corresponding angle in the reversed direction so that the movable member 34 is moved toward the end wall 42, the projections 54 of the movable member is brought to engage with the cuts 55 on the end wall 42 and the notch 53 of the movable member is brought to disengage with the projection 56 of the mounting bracket. In this condition, the shifting pin 31 and the connecting member 33 are integrated into a single element in a sense. Then, the operator can accomplish the operation for selection of the gearing position by pivoting the shifting handle 47 around the axis of the mounting bracket 32 and the operation for entering the gearing position by pivoting the shifting handle 47 around the stud 38 to cause the shifting pin 31 to rotate around the stud 38.

While several preferred embodiments have been chosen to illustrate the present invention, it will be apparent to those skilled in the art from this disclosure that various changes and modifications can be made herein without departing from the scope of the invention as defined in the appended claims. Furthermore, the forgoing description of the embodiments according to the present invention are provided for illustration only, and not for the purpose of limiting the invention as defined by the appended claims and their equivalents.

What is claimed is:

1. An anti-theft device for use in the operation mechanism of a means of transportation, comprising:
   a mounting bracket for supporting said anti-theft device and mounted on the body of said means of transportation;
   a connecting member coupled to a manually operated component;
   a lock unit movable under the control of a coded means; and
   a movable member arranged slidably but non-rotatably on a steering column or shifting pin of said means of transportation, when said lock unit being activated said movable member being caused, through the means of transmission between said movable member and said lock unit, to move between a first position in which said movable member is engaged with said mounting bracket and simultaneously disengaged with said connecting member, and a second position in which said movable member is engaged with said connecting member and simultaneously disengaged with said mounting bracket;
   wherein said movable member is provided with a notch which extends in the direction in which said movable member is moved, the end of said shifting pin being disposed within said notch such that said movable member is able to slide laterally but not rotate relative to said shifting pin.

2. The anti-theft device as claimed in claim 1, wherein the engagement between said movable member and said mounting bracket is accomplished through at least one projection provided on said mounting bracket and at least one complementary cut, and the engagement between said movable member and said connecting member is accomplished through at least one projection provided on said movable member and at least one complementary cut provided on said connecting member.

3. The anti-theft device as claimed in claim 1, wherein said connecting member and said end of said shifting pin are rotatably mounted on said mounting bracket through a stud, while said mounting bracket is rotatably mounted on said body, with the axis of said stud being perpendicular to the axis around which said mounting bracket rotates.

4. An anti-theft device for use in the operation mechanism of a means of transportation, comprising:
   a mounting bracket for supporting said anti-theft device and mounted on the body of said means of transportation;
   a connecting member coupled to a manually operated component;
   a lock unit movable under the control of a coded means; and
   a movable member arranged slidably but non-rotatably on a steering column or shifting pin of said means of transportation, when said lock unit being activated said movable member being caused, through the means of transmission between said movable member and said lock unit, to move between a first position in which said movable member is engaged with said mounting bracket and simultaneously disengaged with said connecting member, and a second position in which said movable member is engaged with said connecting member and simultaneously disengaged with said mounting bracket;
   wherein said manually operated component is a shifting lever or shifting handle disposed pivotally on said connecting member, one end of said shifting lever is connected to said shifting pin.

5. The anti-theft device as claimed in claim 4, wherein the connection between said shifting lever and said shifting pin is ball socket connection.

6. An anti-theft device for use in the operation mechanism of a means of transportation, comprising:
   a mounting bracket for supporting said anti-theft device and mounted on the body of said means of transportation;
   a connecting member coupled to a manually operated component;
   a lock unit movable under the control of a coded means; and
   a movable member arranged slidably but non-rotatably on a steering column or shifting pin of said means of transportation, when said lock unit being activated said movable member being caused, through the means of transmission between said movable member and said lock unit, to move between a first position in which said movable member is engaged with said mounting bracket and simultaneously disengaged with said connecting member, and a second position in which said movable member is engaged with said connecting member and simultaneously disengaged with said mounting bracket;
   wherein said connecting member and an end of said shifting pin are rotatably mounted on said mounting bracket through a stud, while said mounting bracket is rotatably mounted on said body, with the axis of said stud being perpendicular to the axis around which said mounting bracket rotates.

7. An anti-theft device for use in the operation mechanism of a means of transportation, comprising:
   a mounting bracket for supporting said anti-theft device and mounted on the body of said means of transportation;
   a connecting member coupled to a manually operated component;
   a lock unit movable under the control of a coded means; and
   a movable member arranged slidably but non-rotatably on a steering column or shifting pin of said means of transportation, when said lock unit being activated said movable member being caused, through the means of transmission between said movable member and said lock unit, to move between a first position in which said movable member is engaged with said mounting bracket and simultaneously disengaged with said connecting member, and a second position in which said movable member is engaged with said connecting member and simultaneously disengaged with said mounting bracket;
   wherein said movable member is attached to said steering column or shifting pin through key or spline,
   wherein said manually operated component is a shifting lever or shifting handle disposed pivotally on said connecting member, one end of said shifting lever is connected to said shifting pin.

* * * * *